(12) United States Patent
Piette et al.

(10) Patent No.: US 11,100,350 B2
(45) Date of Patent: Aug. 24, 2021

(54) METHOD AND SYSTEM FOR OBJECT CLASSIFICATION USING VISIBLE AND INVISIBLE LIGHT IMAGES

(71) Applicant: Avigilon Corporation, Vancouver (CA)

(72) Inventors: Kevin Piette, Carlisle, MA (US); Pietro Russo, Melrose, MA (US); Mahesh Saptharishi, Sudbury, MA (US); Bo Yang Yu, Winchester, MA (US)

(73) Assignee: AVIGILON CORPORATION, Vancouver (CA)

( * ) Notice: Subject to any disclaimer, the term of this patent is extended or adjusted under 35 U.S.C. 154(b) by 79 days.

(21) Appl. No.: 16/279,975

(22) Filed: Feb. 19, 2019

(65) Prior Publication Data

US 2019/0258885 A1 Aug. 22, 2019

Related U.S. Application Data

(60) Provisional application No. 62/632,218, filed on Feb. 19, 2018.

(51) Int. Cl.
*G06K 9/20* (2006.01)
*G06K 9/62* (2006.01)
*G06K 9/66* (2006.01)
*G06K 9/00* (2006.01)

(52) U.S. Cl.
CPC ....... *G06K 9/2018* (2013.01); *G06K 9/00771* (2013.01); *G06K 9/6256* (2013.01); *G06K 9/6267* (2013.01); *G06K 9/66* (2013.01)

(58) Field of Classification Search
CPC .......................... G06K 9/2018; G06K 9/6256
See application file for complete search history.

(56) References Cited

U.S. PATENT DOCUMENTS

| | | | |
|---|---|---|---|
| 2006/0018565 | A1 | 1/2006 | Davidson et al. |
| 2007/0112695 | A1 | 5/2007 | Wang et al. |
| 2015/0066825 | A1 | 3/2015 | Harrison et al. |
| 2016/0178353 | A1* | 6/2016 | Angot .................. H04N 5/2226 348/140 |
| 2016/0331120 | A1* | 11/2016 | Scheele ................ A46B 5/0025 |

(Continued)

OTHER PUBLICATIONS

Liu, Wei, et al., "SSD: Single Shot MultiBox Detector," available at <https://github.com/weiliu89/caffe/tree/ssd>, Dec. 29, 2016, pp. 1-17.

(Continued)

*Primary Examiner* — Tuan H Nguyen
(74) *Attorney, Agent, or Firm* — Perry + Currier, Inc.

(57) ABSTRACT

Methods, systems, and techniques for classifying and/or detecting objects using visible and invisible light images. A visible light image and an invisible light image are received at a convolutional neural network (CNN). The visible light image depicts a region-of-interest imaged using visible light. The invisible light image depicts at least a portion of the region-of-interest imaged using invisible light, and at least one of the images depicts an object-of-interest within the portion of the region-of-interest shared between the images. The CNN then classifies and/or detects the object-of-interest using the images. The CNN may be trained to perform this classification and/or detection using pairs of visible and invisible light training images.

21 Claims, 14 Drawing Sheets

(56) References Cited

U.S. PATENT DOCUMENTS

2016/0343131 A1* 11/2016 Holt ..................... G01N 23/046
2018/0157939 A1    6/2018 Butt et al.
2020/0167972 A1*  5/2020 Birnhack ................. G06N 3/08
2020/0330028 A1* 10/2020 Nejati ................... G06N 3/0454

OTHER PUBLICATIONS

Redmon, J. et al., "You Only Look Once: Unified, Real-Time Object Detection," arXiv:1506.02640v5 [cs.CV], May 9, 2016, available at <https://arxiv.org/pdf/1506.02640v5.pdf>, pp. 1-10.

* cited by examiner

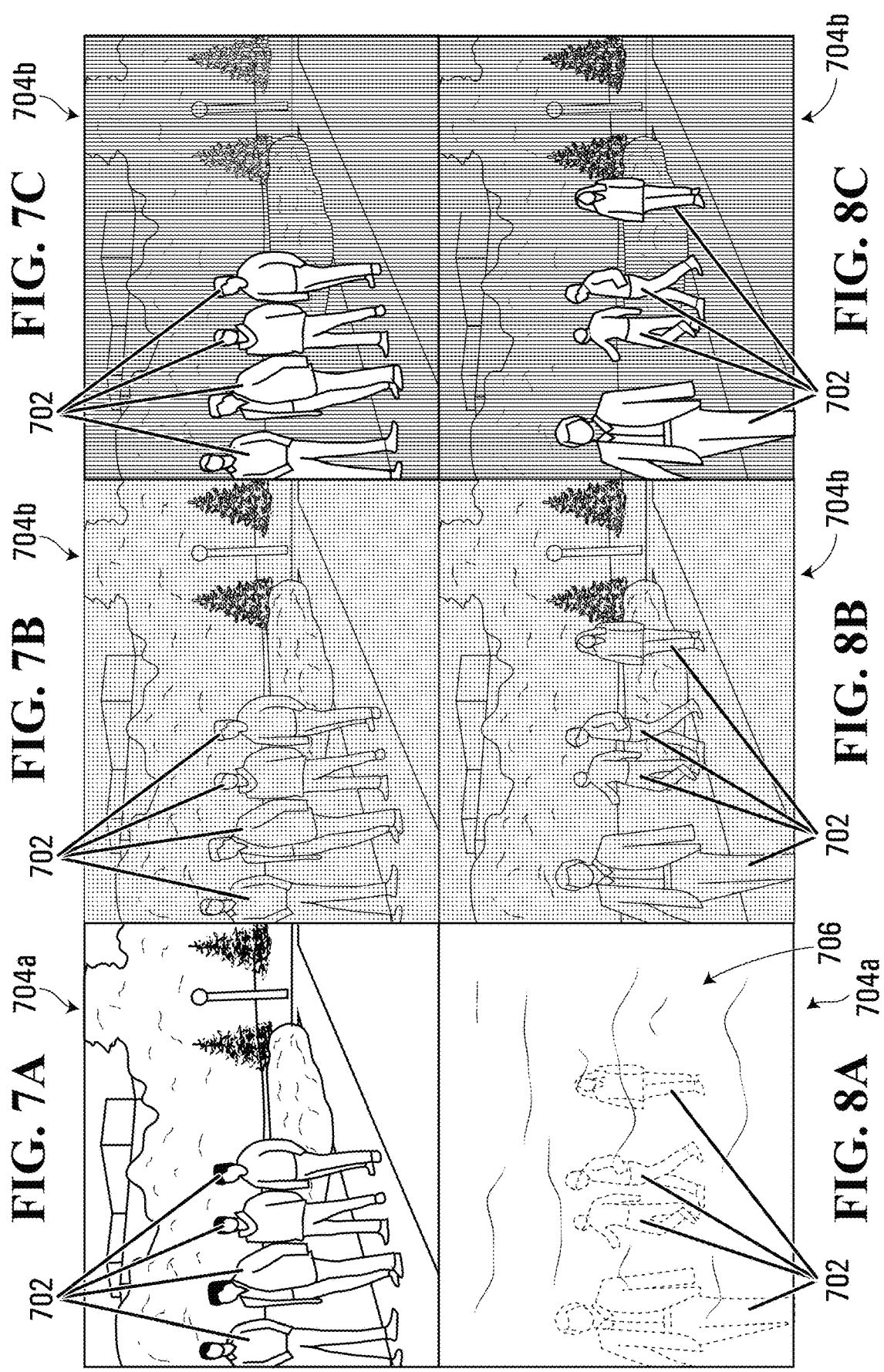

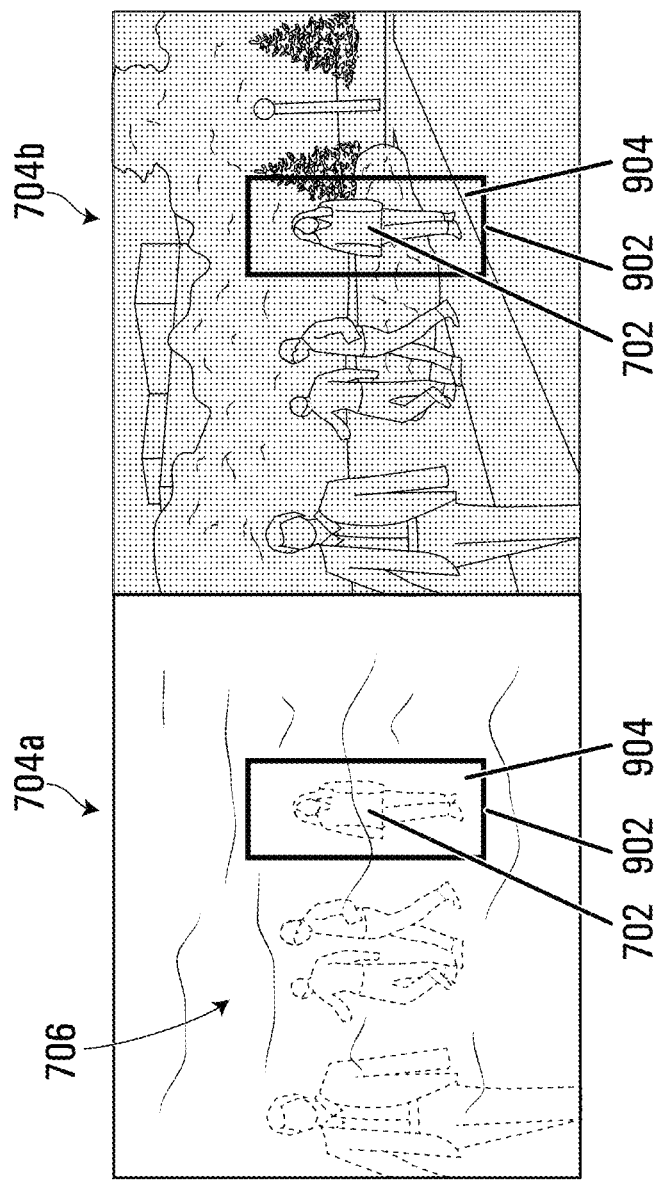

METHOD AND SYSTEM FOR OBJECT CLASSIFICATION USING VISIBLE AND INVISIBLE LIGHT IMAGES

RELATED U.S. APPLICATION DATA

The present application claims the benefit of provisional application No. 62/632,218 filed on Feb. 19, 2018, the entire contents of which are hereby incorporated by reference.

TECHNICAL FIELD

The present disclosure relates to methods, systems, and techniques for object classification and/or detection using visible and invisible light images.

BACKGROUND

Computer-implemented visual object classification, also called object recognition, pertains to classifying visual representations of real-life objects found in still images or motion videos captured by a camera. By performing visual object classification, each visual object found in the still images or motion video is classified according to its type (such as, for example, human, vehicle, and animal).

Surveillance systems typically employ video cameras or other image capturing devices or sensors to collect image data such as videos. In the simplest systems, images represented by the image data are displayed for contemporaneous screening by security personnel and/or recorded for later review after a security breach. In those systems, the task of detecting and classifying visual objects of interest is performed by a human observer. A significant advance occurs when the system itself is able to perform object detection and classification, either partly or completely.

In a typical surveillance system, one may be interested in, for example, detecting objects such as humans, vehicles, and animals that move through the environment. More generally, it is beneficial for a surveillance system to be able to, without relying on assistance from a human operator, identify and classify, in a computationally efficiently manner, different objects that are recorded by the cameras that form part of the system.

SUMMARY

According to a first aspect, there is provided a method comprising: receiving at a convolutional neural network: a visible light image comprising a region-of-interest imaged using visible light; and an invisible light image comprising at least a portion of the region-of-interest imaged using invisible light, wherein at least one of the visible and invisible light images depicts an object-of-interest within the portion of the region-of-interest shared between the images; and classifying and/or detecting the object-of-interest using the convolutional neural network, wherein the convolutional neural network classifies and/or detects the object-of-interest using the visible and invisible light images.

Prior to receiving the visible and invisible light images the convolutional neural network may be trained to classify and/or detect the object-of-interest using training image pairs, each of at least some of the training image pairs may comprise a first training image comprising a training region-of-interest imaged using visible light and a second training image comprising the region-of-interest imaged using invisible light, and at least one of the first and second training images may depict a training object-of-interest within the training region of interest.

The training object-of-interest may be an identical type of object as the object-of-interest depicted in at least one of the visible and invisible light images.

The visible light may comprise wavelengths selected from a range of approximately 400 nm to approximately 700 nm.

The invisible light may comprise wavelengths selected from a range of approximately 10 nm to approximately 400 nm.

The invisible light may comprise wavelengths selected from a range of approximately 400 nm to approximately 1 mm.

The invisible light may comprise wavelengths selected from a range of approximately 0.75 μm to approximately 1.4 μm.

The invisible light may comprise wavelengths selected from a range of approximately 3 μm to approximately 8 μm.

The invisible light may comprise wavelengths selected from a range of approximately 8 μm to approximately 15 μm.

The invisible light may comprise wavelengths selected from a range of approximately 400 nm to approximately 1 mm.

The invisible light may comprise wavelengths selected from a range of approximately 0.1 cm to approximately 1 m.

The invisible light may comprise wavelengths selected from a range of approximately 2.7 mm to approximately 100 m.

The invisible light may comprise wavelengths selected from a range of approximately 0.75 cm to approximately 1.1 cm.

The invisible light may comprise wavelengths selected from a range of approximately 100 μm to approximately 1 mm.

The invisible light may comprise wavelengths selected from a range of approximately 1 mm to approximately 1 cm.

The visible and invisible light images may collectively comprise a number of channels, and the convolutional neural network may comprise at least some layers connected in series that sequentially process the channels.

The layers may comprise at least one convolutional layer that receives the visible and invisible light images and at least one pooling layer that receives an output of the at least one convolutional layer.

The convolutional neural network may further comprise a multilayer perceptron network that receives an output of the at least one pooling layer and that outputs a classification of the object-of-interest.

The convolutional neural network may be implemented on a camera comprising part of a video surveillance system.

The camera may comprise a pan-tilt-zoom camera, dome camera, in-ceiling camera, box camera, or bullet camera.

The visible and invisible light images may be image chips derived from images captured by the camera.

The object-of-interest may be depicted in only the invisible light image and not the visible light image.

The object-of-interest may be depicted in the visible and invisible light images.

The portion of the region-of-interest shared between the images may be substantially spatially correlated with each other.

The portion of the region-of-interest shared between the images may be an entirety of each of the images.

According to another aspect, there is provided a video capture assembly comprising: an image sensor assembly receptive to visible and invisible light; a processor communicatively coupled to the image sensor assembly; and a memory device communicatively coupled to the processor, wherein the memory device has stored thereon computer program code that is executable by the processor and that, when executed by the processor, causes the processor to perform the method of any of the foregoing aspects or suitable combinations thereof.

The image sensor assembly may comprise: a pair of image sensors positioned to have overlapping fields-of-view; and a visible light filter positioned over one of the pair of image sensors and an invisible light filter positioned over the other of the pair of image sensors.

The pair of image sensors may be collocated within a housing.

The video capture assembly may further comprise a first video capture device and a second video capture device, the first video capture device containing one of the pair of image sensors and the visible light filter and the second video capture device containing the other of the pair of image sensors and the visible light filter.

Each of the video capture devices may comprise a pan-tilt-zoom camera, dome camera, in-ceiling camera, box camera, or bullet camera.

According to another aspect, there is provided a non-transitory computer readable medium having stored thereon computer program code that is executable by a processor and that, when executed by the processor, causes the processor to perform the method of any of the foregoing aspects or suitable combinations thereof.

According to another aspect, there is provided a method comprising: generating, using a video capture assembly that comprises part of a video surveillance system, a visible light image comprising a region-of-interest imaged using visible light and an invisible light image comprising at least a portion of the region-of-interest imaged using invisible light, wherein at least one of the visible and invisible light images depicts an object-of-interest within the portion of the region-of-interest shared between the images; sending the visible and invisible light images to an artificial neural network; and classifying and/or detecting the object-of-interest using the artificial neural network, wherein the artificial neural network classifies and/or detects the object-of-interest using the visible and invisible light images.

Prior to receiving the visible and invisible light images the artificial neural network may be trained to classify and/or detect the object-of-interest using training image pairs, each of at least some of the training image pairs may comprise a first training image comprising a training region-of-interest imaged using visible light and a second training image comprising the region-of-interest imaged using invisible light, and at least one of the first and second training images may depict a training object-of-interest within the training region of interest.

The training object-of-interest may be an identical type of object as the object-of-interest depicted in at least one of the visible and invisible light images.

The visible light may comprise wavelengths selected from a range of approximately 400 nm to approximately 700 nm.

The invisible light may comprise wavelengths selected from a range of approximately 10 nm to approximately 400 nm.

The invisible light may comprise wavelengths selected from a range of approximately 400 nm to approximately 1 mm.

The invisible light may comprise wavelengths selected from a range of approximately 0.75 µm to approximately 1.4 µm.

The invisible light may comprise wavelengths selected from a range of approximately 3 µm to approximately 8 µm.

The invisible light may comprise wavelengths selected from a range of approximately 8 µm to approximately 15 µm.

The invisible light may comprise wavelengths selected from a range of approximately 400 nm to approximately 1 mm.

The invisible light may comprise wavelengths selected from a range of approximately 0.1 cm to approximately 1 m.

The invisible light may comprise wavelengths selected from a range of approximately 2.7 mm to approximately 100 m.

The invisible light may comprise wavelengths selected from a range of approximately 0.75 cm to approximately 1.1 cm.

The invisible light may comprise wavelengths selected from a range of approximately 100 µm to approximately 1 mm.

The invisible light may comprise wavelengths selected from a range of approximately 1 mm to approximately 1 cm.

The visible and invisible light images may collectively comprise a number of channels, and the artificial neural network may comprise a convolutional neural network that comprises at least some layers that are connected in series and sequentially process the channels.

The layers may comprise at least one convolutional layer that receives the visible and invisible light images and at least one pooling layer that receives an output of the at least one convolutional layer.

The convolutional neural network may further comprise a multilayer perceptron network that receives an output of the at least one pooling layer and that outputs a classification of the object-of-interest.

The artificial neural network may be implemented on the video capture assembly.

The visible and invisible light images may be image chips derived from images captured by the video capture assembly.

The object-of-interest may be depicted in only the invisible light image and not the visible light image.

The object-of-interest may be depicted in the visible and invisible light images.

The video capture assembly may comprise a pan-tilt-zoom camera, dome camera, in-ceiling camera, box camera, or bullet camera.

The portion of the region-of-interest shared between the images may be substantially spatially correlated with each other.

The portion of the region-of-interest shared between the images may be an entirety of each of the images.

According to another aspect, there is provided a video surveillance system comprising: a video capture assembly; and a server communicatively coupled to the video capture assembly, wherein at least one of the camera and the server are configured to perform the method of any of the foregoing aspects and suitable combinations thereof.

The assembly and the server may collectively perform the method.

The assembly may perform all of the method.

The server may perform all of the method.

The assembly may comprise: a pair of image sensors positioned to have overlapping fields-of-view; and a visible light filter positioned over one of the pair of image sensors and an invisible light filter positioned over the other of the pair of image sensors.

The pair of image sensors may be collocated within a housing.

The camera may comprise a pan-tilt-zoom camera, dome camera, in-ceiling camera, box camera, or bullet camera.

According to another aspect, there is provided a non-transitory computer readable medium having stored thereon computer program code that is executable by a processor and that, when executed by the processor, causes the processor to perform the method of any of the foregoing aspects or suitable combinations thereof.

According to another aspect, there is provided a method comprising: providing training image pairs to an artificial neural network, wherein at least some of each of the training image pairs comprise: a first training image comprising a training region-of-interest imaged using visible light; and a second training image comprising a portion of the training region-of-interest imaged using invisible light, wherein at least one of the first and second training images depicts a training object-of-interest within the portion of the training region of interest shared between the images; and training, by using the pairs of training images, the artificial neural network to classify and/or detect an object-of-interest that appears in at least one of the first and second training images.

The training object-of-interest may be an identical type of object as the object-of-interest depicted in at least one of the visible and invisible light images.

The first and second training images may collectively comprise a number of channels, and the artificial neural network may comprise a convolutional neural network that comprises multiple layers that are connected in series and sequentially process the channels.

The portion of the training region-of-interest shared between the images may be substantially spatially correlated with each other.

The portion of the training region-of-interest shared between the images may be an entirety of each of the images.

According to another aspect, there is provided a system comprising: a storage device that stores pairs of training images; a processor communicatively coupled to the storage device and to a convolutional neural network; and a memory device communicatively coupled to the processor, wherein the memory device has stored thereon computer program code that is executable by the processor and that, when executed by the processor, causes the processor to perform the method of any of the foregoing aspects or suitable combinations thereof.

According to another aspect, there is provided a non-transitory computer readable medium having stored thereon computer program code that is executable by a processor and that, when executed by the processor, causes the processor to perform the method of any of the foregoing aspects or suitable combinations thereof.

This summary does not necessarily describe the entire scope of all aspects. Other aspects, features and advantages will be apparent to those of ordinary skill in the art upon review of the following description of example embodiments.

BRIEF DESCRIPTION OF THE DRAWINGS

In the accompanying drawings, which illustrate one or more example embodiments:

FIGS. 7A-7C depict a visible light image (FIG. 7A) and invisible light images (FIGS. 7B and 7C) depicting objects-of-interest, according to another example embodiment;

FIGS. 8A-8C depict a visible light image (FIG. 8A) and invisible light images (FIGS. 8B and 8C) respectively corresponding to the images of FIGS. 7A-7C, in which the objects-of-interest are occluded by fog;

FIGS. 9A and 9B depict a visible light image (FIG. 9A) and an invisible light image (FIG. 9B) respectively corresponding to the images of FIGS. 8A and 8B in which chips are used to select a single person as the object-of-interest, according to another example embodiment;

DETAILED DESCRIPTION

Figure 1:
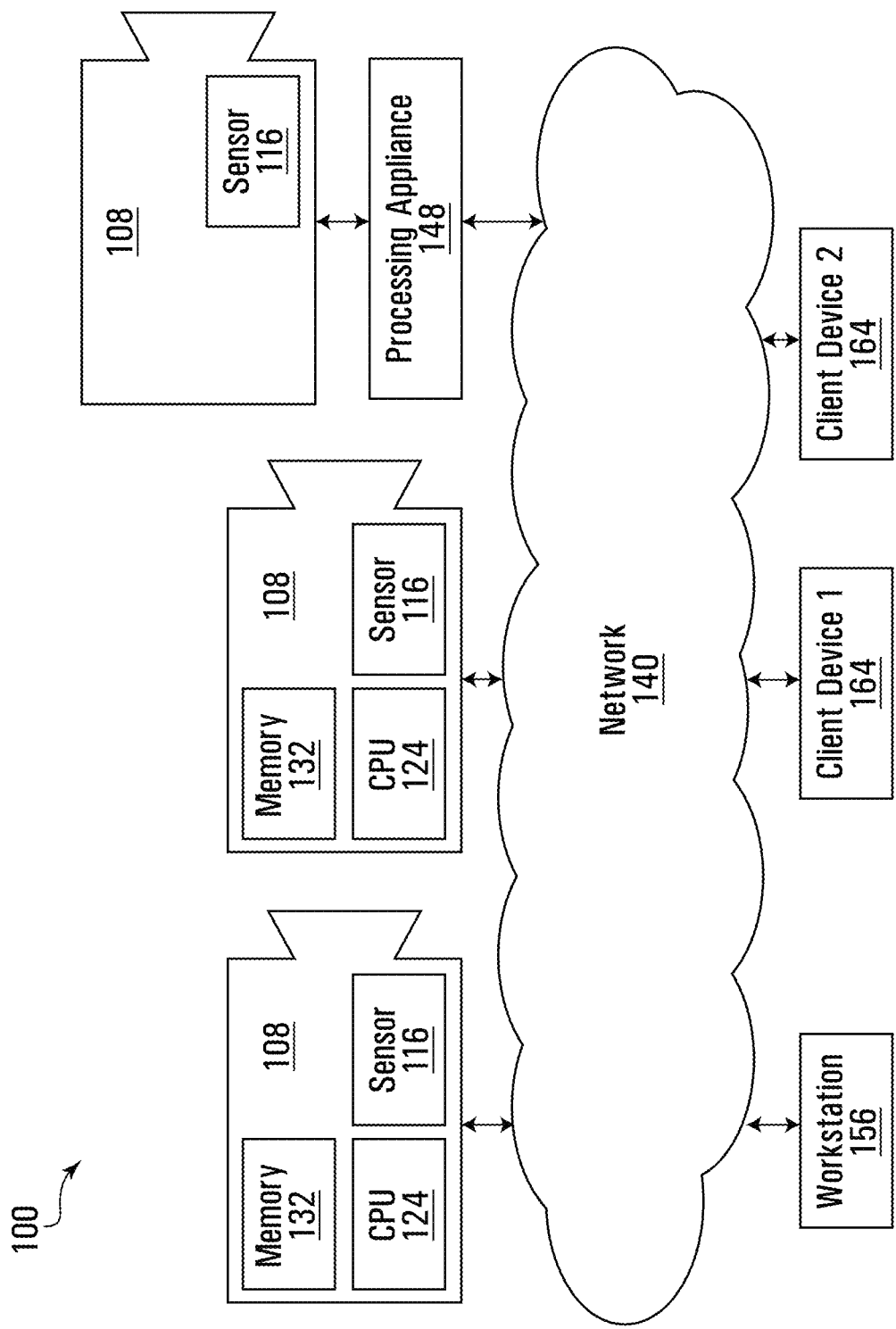
FIG. 1 illustrates a block diagram of connected devices of a video capture and playback system according to an example embodiment.

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

The word "approximately" when used in conjunction with a number means, depending on the embodiment, that number itself, within 1% of that number, within 2% of that number, within 3% of that number, within 4% of that number, within 5% of that number, within 6% of that number, within 7% of that number, within 8% of that number, within 9% of that number, or within 10% of that number.

A plurality of sequential image frames may together form a video captured by the video capture device. Each image frame may be represented by a matrix of pixels, each pixel having a pixel image value. For example, the pixel image value may be a single numerical value for grayscale (such as, for example, 0 to 255) or a plurality of numerical values for colored images. Examples of color spaces used to represent pixel image values in image data include RGB, YUV, CYKM, YCBCR 4:2:2, YCBCR 4:2:0 images.

"Metadata" or variants thereof herein refers to information obtained by computer-implemented analyses of images including images in video. For example, processing video may include, but is not limited to, image processing operations, analyzing, managing, compressing, encoding, storing, transmitting, and/or playing back the video data. Analyzing the video may include segmenting areas of image frames and detecting visual objects, and tracking and/or classifying visual objects located within the captured scene represented by the image data. The processing of the image data may also cause additional information regarding the image data or visual objects captured within the images to be output. That additional information is commonly referred to as "metadata". The metadata may also be used for further processing of the image data, such as drawing bounding boxes around detected objects in the image frames.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1, therein illustrated is a block diagram of connected devices of a video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images. The video capture device 108 or camera 108 is an image capturing device and includes security video cameras.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD. In at least one different example embodiment (not depicted), the video capture device 108 may comprise an analog camera connected to an encoder, with the encoder digitizing analog video captured by the analog camera for subsequent processing.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared range and/or ultraviolet range. In other examples, the video capture device 108 may be a multi-sensor camera that includes two or more sensors that are operable to capture light in different frequency ranges. In at least some example embodiments, any one or more of the video capture devices 108 may comprise one or more color filter arrays, each of which is operable to selectively filter between visible and invisible light incident on an image sensor, such as those depicted in FIGS. 12A to 12C.

The at least one video capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller. More generally, the at least one video capture device 108 may include a combination device, which is any device comprising a camera and at least one additional device that has non-camera functionality, and in which the camera and at least one additional device are contained within a single housing or are otherwise suitably collocated. For example, an intercom that comprises a camera collocated within the same housing as a display and an audio transceiver is an example of a combination device.

In at least some example embodiments, the video capture device 108 may be a mobile device, examples of which include the laptop, tablet, drone device, and smartphone. The mobile device may have its own propulsion unit, such as the drone device; alternatively, the mobile device may lack a propulsion unit, such as the laptop, tablet, and smartphone.

Each video capture device 108 includes one or more processors 124, one or more memory devices 132 coupled to the processors and one or more network interfaces. The memory device can include a local memory (such as, for example, a random access memory and a cache memory) employed during execution of program instructions. The processor executes computer program instructions (such as, for example, an operating system and/or application programs), which can be stored in the memory device.

In various embodiments the processor 124 may be implemented by any suitable processing circuit having one or more circuit units, including a digital signal processor (DSP), graphics processing unit (GPU), embedded processor, etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program code. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store data in memory, where the type of memory is volatile memory, non-volatile memory, dynamic memory, etc. or any combination thereof.

In various example embodiments, a plurality of the components of the video capture device 108 may be implemented together within a system on a chip (SOC). For example, the processor 124, the memory device 116 and the network interface of the capture device may be implemented within a SOC. Furthermore, when implemented in this way, a general purpose processor and one or more of a GPU and a DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any suitable communications network that provides reception and transmission of data. For example, the network 140 may be a local area network, external network (such as, for example, WAN, Internet) or a combination thereof. In other examples, the network 140 may include a cloud network.

In some examples, the video capture and playback system 100 includes a processing appliance 148. The processing appliance 148 is operable to process the image data outputted by a video capture device 108. The processing appliance 148 also includes one or more processors and one or more memory devices coupled to the one or more processors (CPU). The processing appliance 148 may also include one or more network interfaces. For convenience of illustration only one processing appliance 148 is shown; however it will be understood that the video capture and playback system 100 may include any suitable number of processing appliances 148.

For example, and as illustrated, the video capture and playback system 100 includes at least one workstation 156 (such as, for example, a server), each having one or more processors including graphics processing units (GPUs). The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (such as, for example, mouse, keyboard, touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation and one or more client devices 164.

In some examples, the image capture and playback system 100 may be implemented without the workstation 156. Accordingly, image processing functionalities may be performed on a system entity other than the workstation 156 such as, for example, the image processing functionalities may be wholly performed on the one or more video capture devices 108. Alternatively, the image processing functionalities may be, for example, shared amongst two or more of the video capture devices 108, processing appliance 148 and client devices 164.

Figure 2:
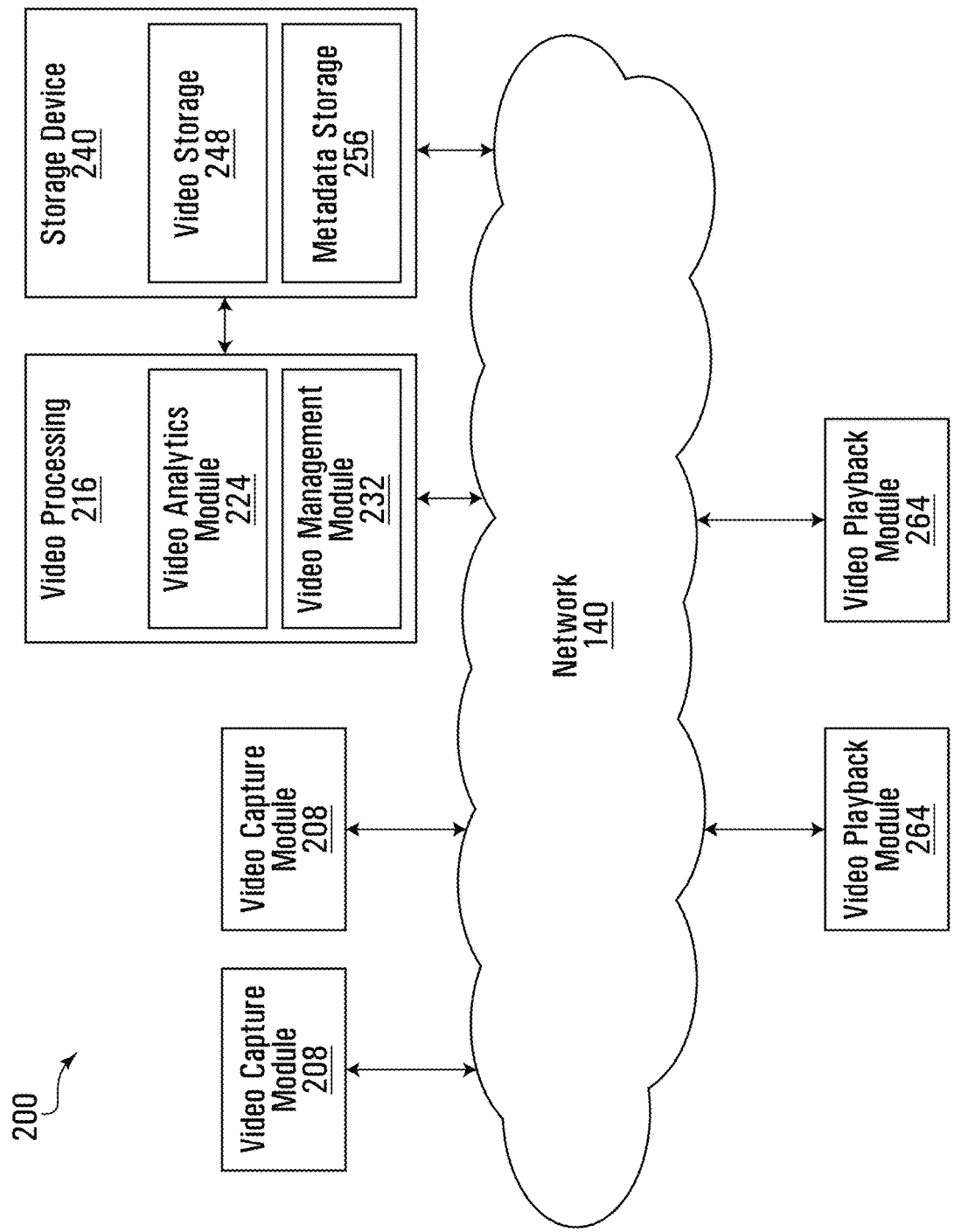
FIG. 2 illustrates a block diagram of a set of operational modules of the video capture and playback system according to the example embodiment of FIG. 1.

Referring now to FIG. 2, there is illustrated a block diagram of a set 200 of operational modules of the video capture and playback system 100 according to one example embodiment. The operational modules may be implemented in hardware, software, or both on one or more of the devices of the video capture and playback system 100 as illustrated in FIG. 1.

The set 200 of operational modules include at least one video capture module 208. For example, each video capture device 108 may implement a video capture module 208. The video capture module 208 is operable to control one or more components (such as, for example, sensor 116, etc.) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. One skilled in the art will understand that the video analytics module 224 generates metadata such as, for example, signatures (image transformations) for objects-of-interest (see, for instance, commonly owned U.S. Pat. Publ. No. 2018/0157939 entitled "SYSTEM AND METHOD FOR APPEARANCE SEARCH", the contents of which are herein incorporated by reference). A signature is, for example, an n-dimensional vector of numerical features (numbers) that represent an image of an object that can be processed by computers. By comparing the signature of one image of one object with the signature of another image, a computer implemented process may determine a likelihood of whether the one image and the other image are images of the same object. The image signatures may be multi-dimensional vectors calculated by, for example, artificial neural networks (examples of which are later herein discussed and are also disclosed in the aforementioned U.S. Pat. Publ. No. 2018/0157939).

Still with reference to FIG. 2, the video analytics module 224 may, based on determinations made, further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identification of objects "left behind" or "removed", and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 (FIG. 1) that will be playing back the video, such as processing power and/or resolution of the display of the client device 164. The video management 232 may also process the image data according to storage capacity within the video capture and playback system 100 for storing image data.

It will be understood that the subset 216 of video processing modules may, in accordance with some example embodiments, include only one of the video analytics module 224 and the video management module 232. Also, in accordance with other alternative example embodiments, the subset 216 of video processing modules may include more video processing modules than those explicitly shown in FIG. 2 (i.e. the video analytics module 224 and the video management module 232).

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data outputted from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented. In at least some example embodiments in which distributed storage is used, some video and/or metadata may be stored locally to the video capture and playback system 100, and some video and/or metadata may also be stored on distributed storage remote from the system 100, such as on cloud storage. For example, video and/or metadata of an entire event may be stored locally on the system 100, and select portions of that video and/or metadata may be concurrently stored on cloud storage. As another example, video and/or metadata may be stored, in its entirety, both locally and on cloud storage for backup purposes. As another example, some video and/or metadata may be stored locally, and additional video and/or metadata may be stored on cloud storage, with the data stored locally differing from the data stored on cloud storage.

The set of operational modules further includes at least one video playback module 264, which is operable to receive image data and playback the image data as a video. For example, the video playback module 264 may be implemented on a client device 164.

The operational modules of the set 200 may be implemented on one or more of the video capture device 108, processing appliance 148, workstation 156, and client device 164 shown in FIG. 1. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of a video capture device 108, processing appliance 148 and workstation 156. Similarly, video management functionalities may be split between one or more of a video capture device 108, processing appliance 148, and workstation 156.

Figure 3:
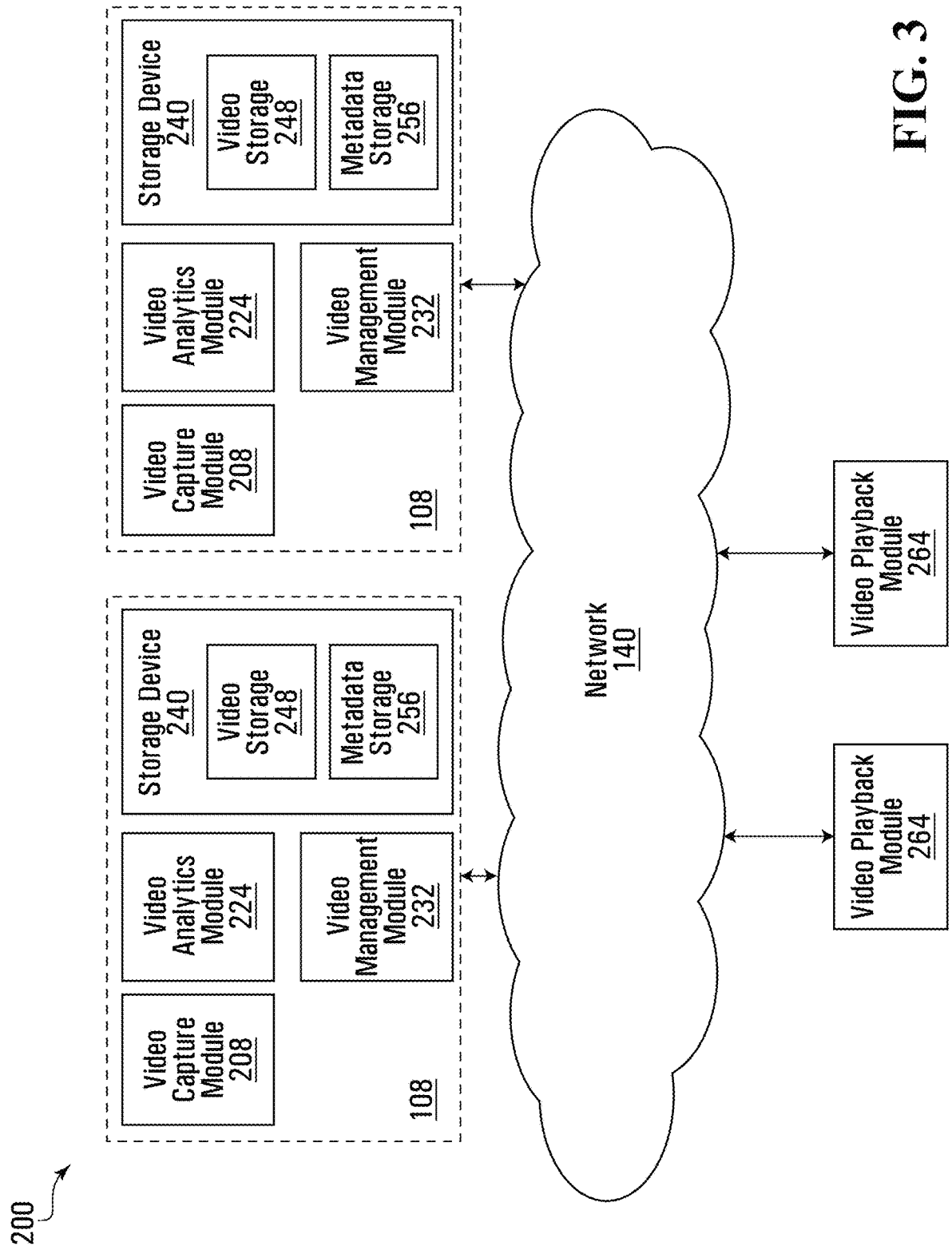
FIG. 3 illustrates a block diagram of a set of operational modules of the video capture and playback system according to the example embodiment of FIG. 1 in which a video analytics module, a video management module, and a storage device are wholly implemented on one or more image capture devices included in the video capture and playback system.

Referring now to FIG. 3, therein illustrated is a block diagram of a set 200 of operational modules of the video capture and playback system 100 according to one particular example embodiment wherein the video analytics module 224, the video management module 232 and the storage device 240 is wholly implemented on the one or more image capture devices 108. Alternatively, the video analytics module 224, the video management module 232 and the storage device 240 is wholly implemented on the processing appliance 148.

It will be appreciated that allowing the subset 216 of image data (video) processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (e.g. manufacturers) or retrofitting an existing video capture and playback system.

In certain embodiments herein, the video analytics module 224 employs an artificial neural network to process the image data and to classify objects-of-interest therein. One example type of artificial neural network that the video analytics module 224 may use is a convolutional neural network (CNN), which may run on, for example, a GPU, a Vision Processing Unit (VPU), etc. The ability of a CNN or any artificial neural network to detect or classify objects-of-interest is limited by the quality of the data input to that network. For example, if an object-of-interest is undiscernible in an image by virtue of being occluded by smoke or shadow, the artificial neural network will be unable to identify the object-of-interest in that image.

At least some example embodiments herein send two images to an artificial neural network: a visible light image comprising a region-of-interest imaged using visible light; and an invisible light image comprising at least a portion of the region-of-interest imaged using invisible light. At least one of the visible and invisible light images depicts an object-of-interest within the portion of the region-of-interest shared between the images. The artificial neural network classifies the object-of-interest using the visible and invisible light images. While at least some example embodiments herein use CNNs as the artificial neural network, in at least some other example embodiments, different types of artificial neural networks may be used as discussed further below. Additionally, while the example embodiment described below uses a single visible light image and a single invisible light image for image classification, in at least some different example embodiments one or more visible light images, one or more invisible light images, or multiple visible and invisible light images may be used by the artificial neural network. For example, in at least some example embodiments, multiple invisible light images, with each image generated using a different range of invisible light wavelengths, may be used; one of the invisible light images may be imaged using ultraviolet light while another may be short-wave infrared light, for example. Additionally or alternatively, multiple visible light images, with each image generated using a different range of visible light wavelengths, may be used; for example, one visible light image may be generated using the entire visible light spectrum while a second visible light image may be generated using only yellow light in order to facilitate classification of yellow objects-of-interest, such as construction helmets.

As used herein, "visible light" refers to light that is visible to human beings without aid of any device, and comprises in at least some example embodiments light from between approximately 400 nm to 700 nm. The phrase "invisible light" refers to light that is not visible light. In at least some example embodiments, invisible light comprises ultraviolet (UV) light; infrared (IR) light; near infrared (NIR) light; short-wavelength infrared (SWIR) light; medium or mid-wavelength infrared light (MWIR); long-wavelength infrared light (LWIR); microwave radiation; radar signals; light in the Terahertz range; and millimeter wave (mmWave) radiation. In at least some example embodiments, UV light comprises wavelengths selected from a range of approximately 10 nm to 400 nm; IR light comprises wavelengths selected from a range of approximately 400 nm to 1 mm; NIR light comprises wavelengths selected from a range of approximately 0.75 µm to 1.4 µm; SWIR light comprises wavelengths selected from a range of approximately 400 nm to 1 mm; MWIR light comprises wavelengths selected from a range of approximately 3 um to 8 um; LWIR comprises wavelengths selected from a range of approximately 8 um to 15 um; microwave radiation comprises wavelengths selected from a range of approximately 0.1 cm to 1 m; radar signals comprise wavelengths selected from a range of approximately 2.7 mm to 100 m and, more particularly, from approximately 0.75 cm to 1.1 cm; light in the Terahertz range comprises wavelengths selected from a range of approximately 100 um to 1 mm; and mmWave radiation is comprises wavelengths selected from a range of approximately 1 mm to 1 cm.

Referring now to FIGS. 7A-7C and 8A-8C, there are shown visible light images 704a and invisible light images 704b, each of which comprise an identical region-of-interest and depict objects-of-interest 702 in the form of persons. Each of FIGS. 7A-7C is taken approximately simultaneously, and each of FIGS. 8A-8C is taken approximately simultaneously. FIGS. 7A and 8A are the visible light images 704a, which image the region-of-interest using visible light. FIGS. 7B and 8B are two invisible light images 704b, which are imaged using SWIR light. FIGS. 7C and 8C are also two invisible light images 704b, which are imaged using LWIR light.

In FIGS. 7A-7C, the region-of-interest does not comprise any visual light obstructions that occlude the objects-of-interest 702. Consequently, the objects-of-interest 702 are clearly discernible in all of the images 704a,b.

In FIGS. 8A-8C, the region-of-interest comprises a visual light obstruction in the form of fog 706, which obstructs visible light from the objects-of-interest 702 from reaching the video capture device 108. Consequently, in FIG. 8A, the objects-of-interest 702 are not clearly visible. However, the fog 706 does not similarly obstruct the SWIR and LWIR light, and consequently the objects-of-interest 702 remain easily discernible in the invisible light images 704b of FIGS. 8B and 8C.

In at least some of the embodiments described below, the visible and invisible light images 704a,b may be sent to a CNN to permit the CNN to classify an object-of-interest 702 using visible and invisible light. This may be particularly useful when certain features of the object-of-interest 702 appear in the invisible light image 704b and do not appear in the visible light image 704a. In at least some example embodiments, these features may be those that would also be visible in the visible light image 704a but for some visual light obstruction, such as the fog 706 of FIG. 8A, that prevents those features from appearing in the visible light image 704a. As another example, in an example embodiment in which the object-of-interest 702 is a person, the visual light obstruction may comprise that person's clothing, and the feature not visible in the visible light image 704a may comprise a tattoo or weapon beneath the object-of-interest's 702 clothing. In at least some other example embodiments, the visual light obstruction may comprise a wall, in which case microwaves may be used to image through the wall. Additionally, in at least some example embodiments in which the visual light obstruction comprises smoke, SWIR or LWIR may be used to image through the smoke.

In at least some additional example embodiments, the features that appear in the invisible light image 704b and not the visible light image 704a may not be occluded, but rather may not generate or reflect sufficient visible light to appear in the visible light image 704a. For example, in low-light conditions, the visible light image 704a may appear too dark for any objects-of-interest 702 in the form of humans to be discernible, but the same scene imaged using IR or UV light may clearly show the objects-of-interest 702. As another example when the object-of-interest 702 is a person, UV light when used to capture a person's face may illuminate facial features, such as skin damage, that are invisible under visible light; those facial features may be used to generate a feature vector that facilitates identification of that person.

Additionally, in FIGS. 7A-7C and 8A-8C, each of the images 704a,b depicts approximately the same region-of-interest. In at least the depicted example embodiments, the CNN 500 accordingly processes substantially identical regions-of-interest that are substantially spatially correlated with each other; that is, all features in the images 704a,b (including any objects-of-interest 702) appear in both images 704a,b and in substantially identical positions in both images 704a,b. This may be achieved, for example, by ensuring the images 704a,b are of the same region-of-interest and by capturing the images 704a,b substantially concurrently.

In at least some example embodiments, the images 704a,b may be crops of larger images. For example, each of the larger images may correspond to the full field-of-view of one of the image sensors 116. The larger images may or may not be spatially correlated with each other. If the larger images depict substantially identical regions-of-interest and are substantially spatially correlated with each other, then crops of corresponding portions of the larger images result in a pair of substantially spatially correlated images 704a,b. In at least some different example embodiments, the larger images may be of different regions-of-interest, but portions of the larger images may share substantially identical regions-of-interest and be substantially spatially correlated with each other; in some of those example embodiments, select crops of those larger images of those shared regions-of-interest may result in images 704a,b that are substantially spatially correlated with each other.

Figure 10:
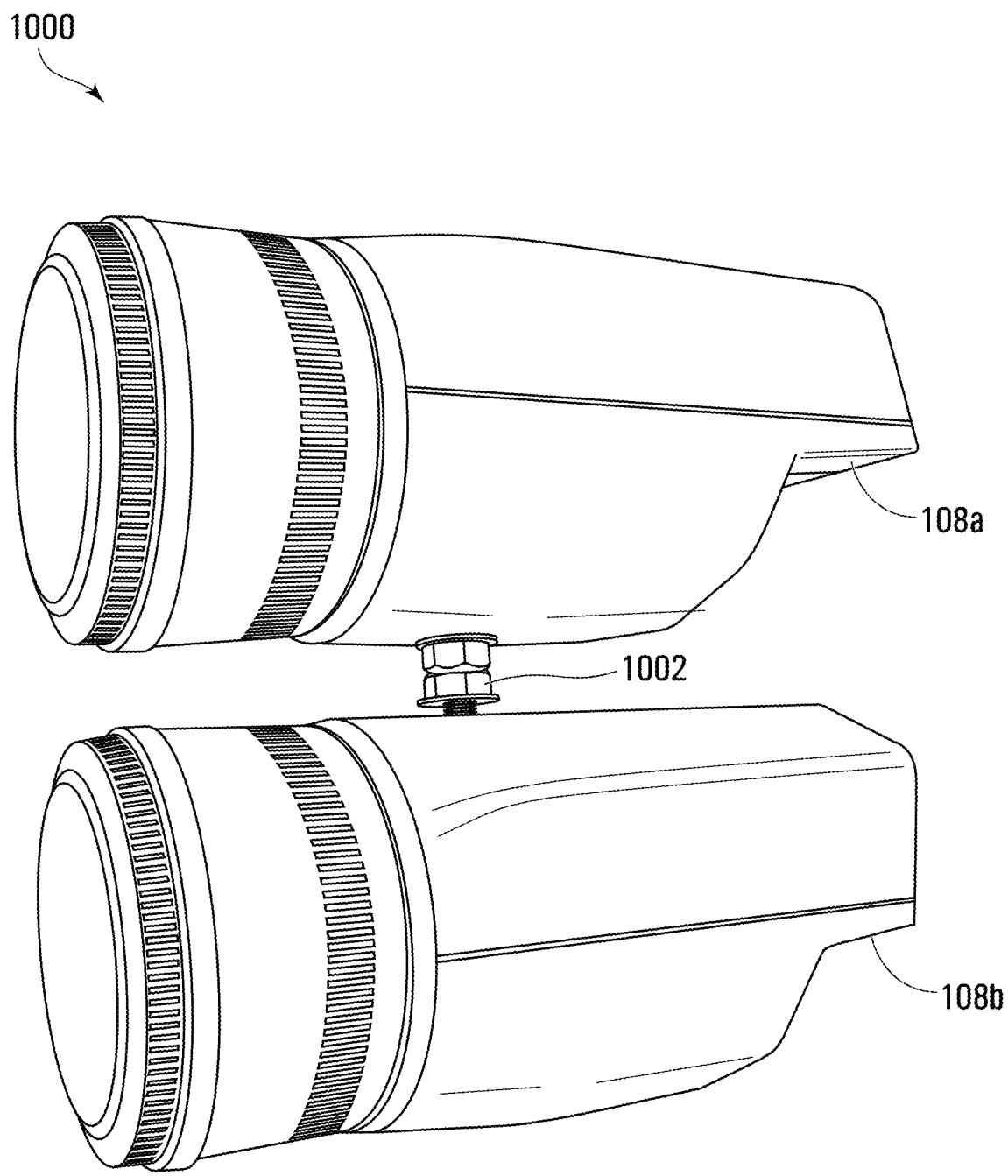
FIG. 10 depicts a video capture assembly that may be used to concurrently capture a visible light image and an invisible light image, according to another example embodiment.

FIG. 10 depicts an example video capture assembly 1000 that may be used to concurrently capture a pair of images 704a,b such that at least portions of the images 704a,b are spatially correlated. The assembly 1000 comprises a first video capture device 108a and a second video capture device 108b that are fixedly coupled to each other using a connector 1002; the first video capture device 108a is configured to generate the visible light image 704a, and the second video capture device 108b is configured to generate the invisible light image 704b. The connector 1002 in at least the depicted example embodiment is rigid and is connected to an underside of the first video capture device 108a and a top side of the second video capture device 108b. The devices 108a,b are aligned such that the optical axes of the devices 108a,b are parallel with each other, and oriented such that the lens apertures of the devices 108a,b are flush with each other; this helps facilitate a common field-of-view between the devices 108a,b. In at least some different example embodiments (not depicted), the devices 108a,b may be differently oriented to each other; for example, the optical axes of the devices 108a,b may be non-parallel, the lens apertures of the devices 108a,b may be offset from each other, or both. Furthermore, while FIG. 10 depicts only a pair of devices 108a,b in at least some different example embodiments (not depicted), the assembly 1000 may comprise three or more of the video capture devices 108, with each of the devices 108a configured to perform imaging using different wavelengths.

Figure 12B:
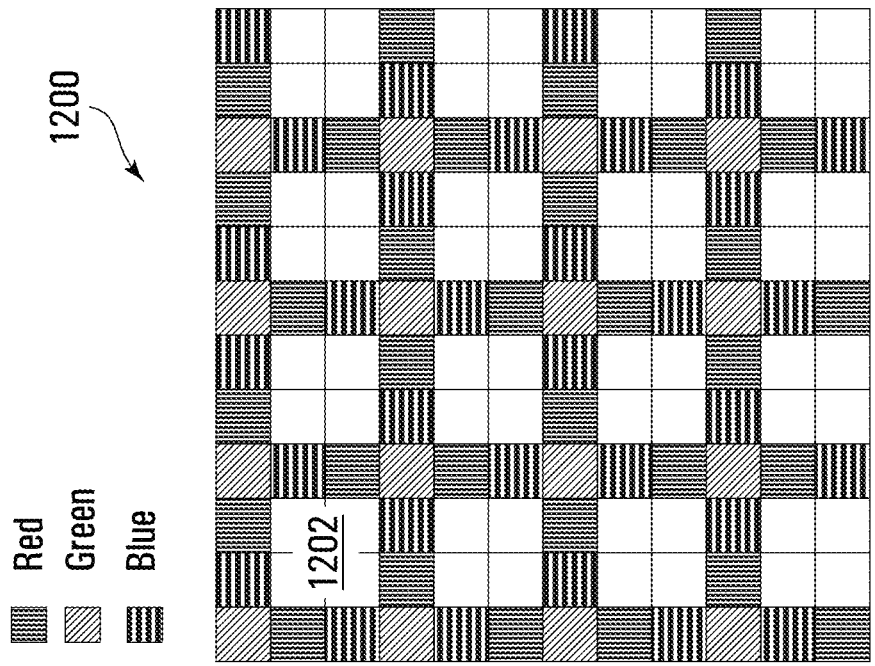
FIG. 12B depicts a color filter array configured to capture invisible light images, according to another example embodiment.
Figure 12A:
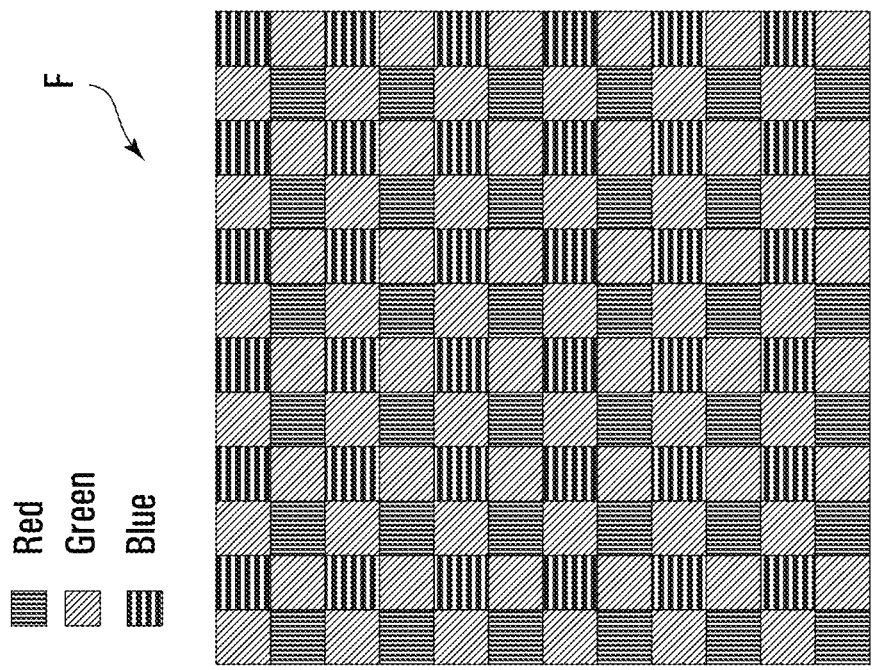
FIG. 12A depicts a Bayer filter (prior art) used for capturing a visible light image.

In at least the depicted example embodiment of FIG. 10, the imager of the first device 108a comprises a visible light filter such as a Bayer filter F, overlaid on the first device's 108a image sensor 116; an example Bayer filter F is depicted in FIG. 12A. The Bayer filter F comprises a repeating 2×2 array of 1×1 green filters G, red filters R, and blue filters B that enables the image sensor 116 to generate the visible light image 704a. The Bayer filter F has twice as many green filters G as red filters R or blue filters F. In at least some example embodiments the second video capture device 108b comprises an invisible light filter 1200, examples of which are depicted in FIGS. 12B and 12C, that enables the second device's 108b image sensor 116 to generate the invisible light image 704b.

The second device 108b may generate the invisible light image 704b using the filter 1200 of FIG. 12B. This filter 1200 comprises a repeating 6×6 array, with each 6×6 array comprising four, 2×2 blocks of a UV light filter 1202, and the remaining filters comprising 1×1 green filters G, red filters R, and blue filters B. In contrast to the Bayer filter F of FIG. 12A, the filter 1200 of FIG. 12B has equal numbers of green filters G, red filters R, and blue filters B.

Figure 12C:
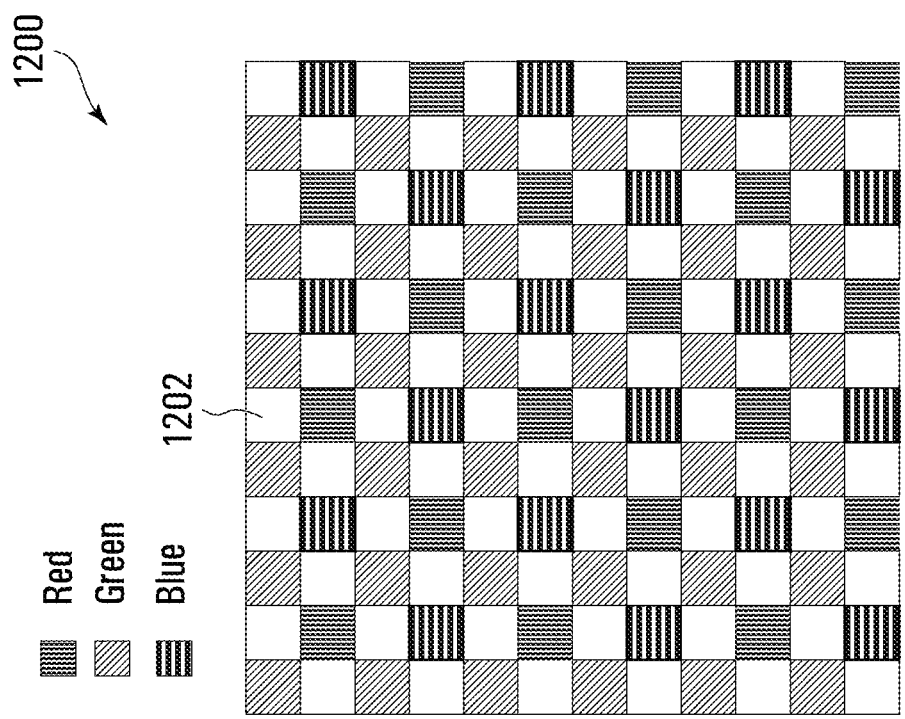
FIG. 12C depicts an alternative color filter array configured to capture invisible light images, according to yet another example embodiment.

The second device 108b may alternatively generate the invisible light image 704b using the embodiment of the filter 1200 depicted in FIG. 12C. This filter 1200 comprises a repeating 5×5 array, with the $1^{st}$, $3^{rd}$ and $5^{th}$ rows in each array comprising alternating 1×1 green filters F and UV light filters 1202; and the $2^{nd}$ and $4^{th}$ rows in each array comprising three, 1×1 UV light filters 1202 in the $1^{st}$, $3^{rd}$ and $5^{th}$ columns, with a 1×1 red filter R or blue filter B in the $2^{nd}$ and $4^{th}$ columns. The filter 1200 of FIG. 12C has twice as many green filters G as red filters R or blue filters B, which is the same ratio of the Bayer filter F of FIG. 12A.

Each of the filters 1200 allows red, green, blue, and UV light to be incident on the image sensor 116, thereby enabling the second device 108b to generate the invisible light image 704b based at least partially on UV light. While the filters 1200 use UV light filters 1202, in at least some different example embodiments the UV light filters 1202 may be replaced with filters configured to filter one or more different wavelengths of invisible light. For example, in at least some different example embodiments the filters 1202 may filter NIR light; any two or more of UV, visible, and NIR light; or different invisible light wavelengths.

More generally, the filters 1200 in at least some example embodiments comprise a combination of visible light filters (such as red filters, green filters, and/or blue filters) and invisible light filters (such as UV filters), thereby permitting an image sensor 116 to image using visible and invisible light.

Figure 11:
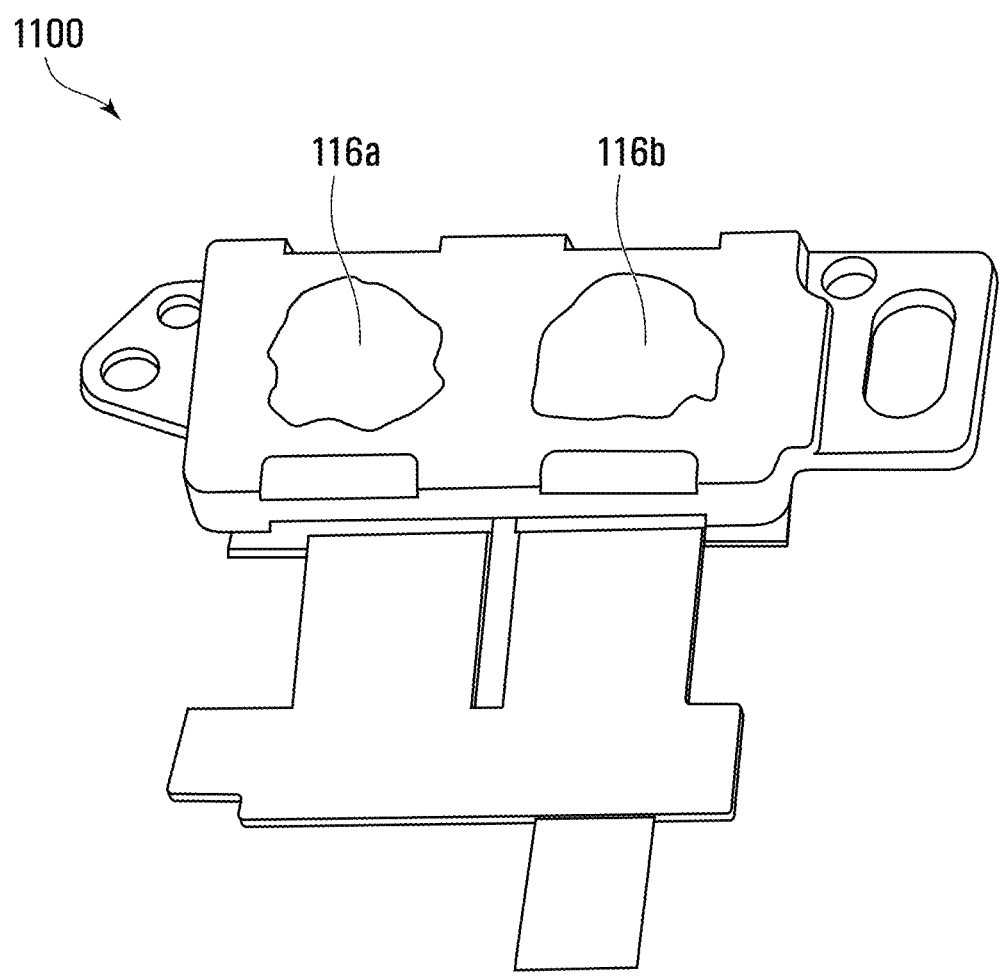
FIG. 11 depicts an image sensor assembly that comprises a pair of collocated image sensors, with one of the image sensors configured to capture a visible light image and another of the image sensors configured to capture an invisible light image, according to another example embodiment.

The assembly 1000 of FIG. 10 comprises one image sensor 116 in one of the video capture devices 108a and another image sensor 116 in the other of the video capture devices 108b. In at least some example embodiments, at least two image sensors 116 may be collocated together in a single housing (not depicted). FIG. 11 depicts an image sensor assembly 1100 that comprises a first image sensor 116a and a second image sensor 116b side-by-side. The assembly 1100 may be contained within a single housing (not depicted), with that housing comprising a first lens and a second lens operable to focus light on the first sensor 116a and second sensor 116b, respectively. One of the sensors 116a is configured to generate the visible light image 704a while another of the sensors 116b is configured to generate the invisible light image 704b; for example, the first sensor 116a may comprise the Bayer filter F and the second sensor 116b may comprise the invisible light filter 1200.

Figure 4:
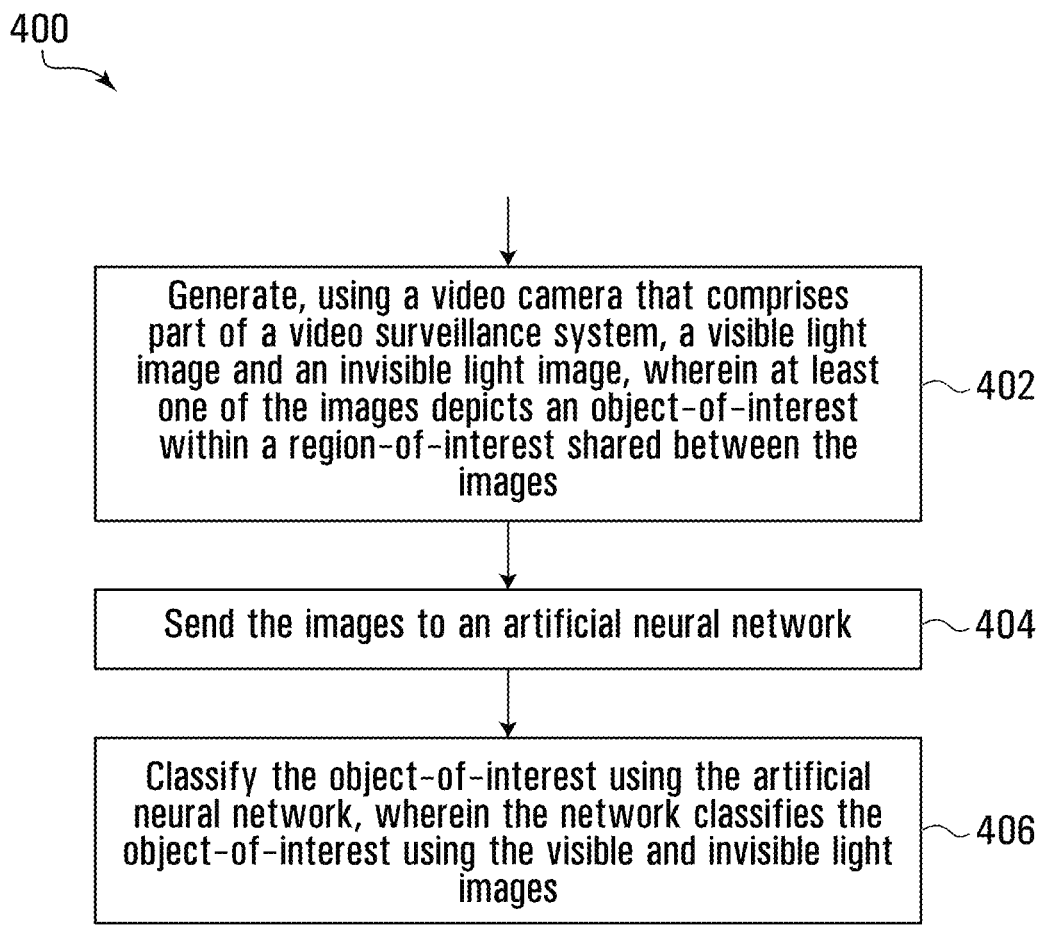
FIG. 4 illustrates a flowchart depicting a method for classifying an object-of-interest using visible and invisible light images, according to another example embodiment.
Figure 5:
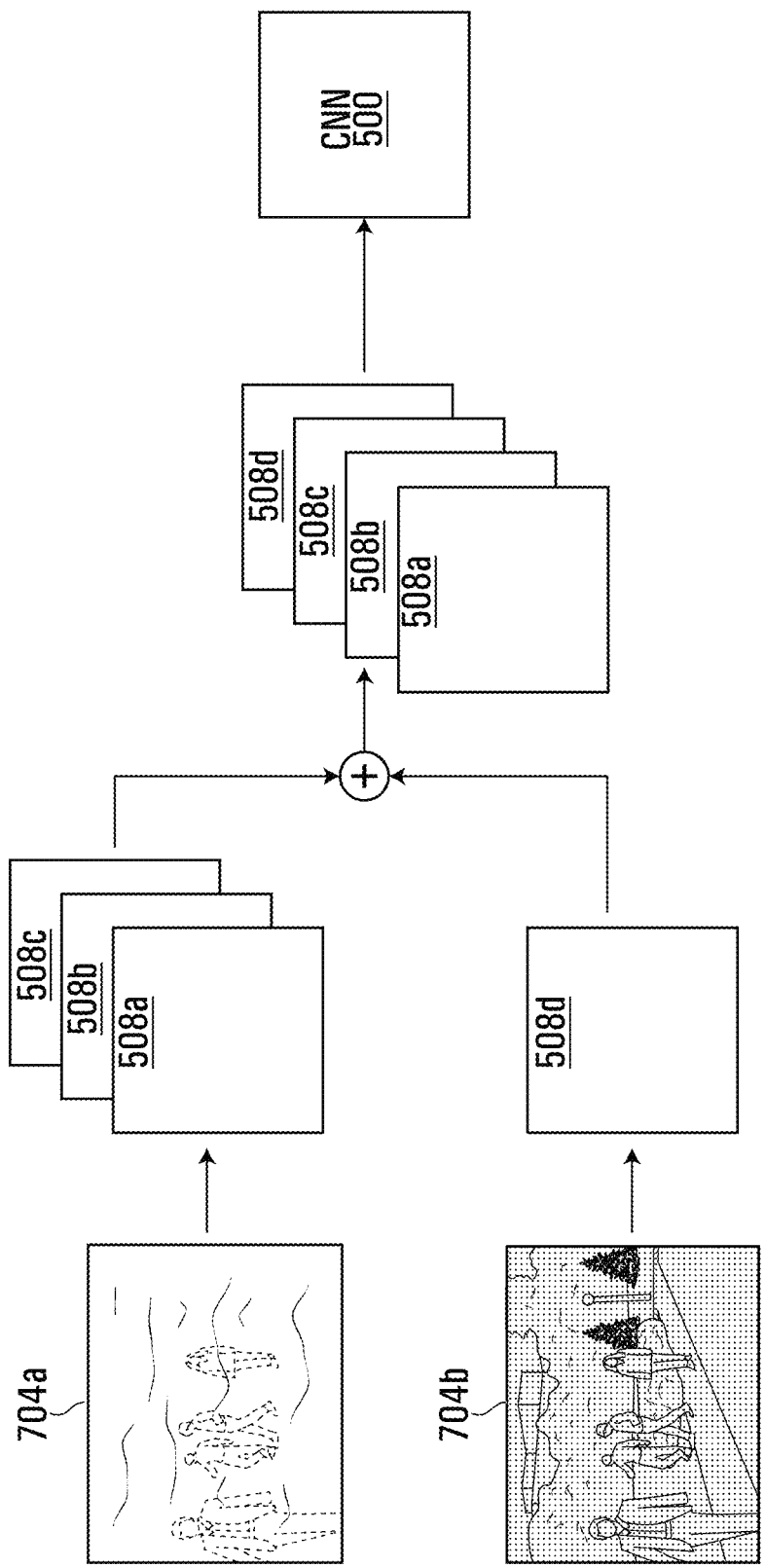
FIG. 5 illustrates visible and invisible light images being input to a convolutional neural network for classification of an object-of-interest depicted in at least one of the images, in accordance with the method of FIG. 4.

Reference will now be made to FIGS. 4 and 5. FIG. 4 depicts a flowchart describing an example method 400 for classifying an object-of-interest 702 using an artificial neural network, which in the method 400 of FIG. 4 comprises a CNN 500 (depicted in FIG. 5). The method 400 may be expressed as computer program code comprising part of the video analytics module 224 of the video capture device 108. At block 402, the camera 108 generates the visible light image 704a and the invisible light image 704b. The visible light image 704a depicts a region-of-interest, of which at least a portion is also present in the invisible light image 704b. The object-of-interest 702 appears in at least one of the images 704a,b in the portion of the region-of-interest shared between the images 704a,b. Once generated, the images 704a,b are sent to the CNN 500 at block 404. The CNN 500 may comprise part of the video surveillance system; alternatively, the CNN 500 may be external to the video surveillance system. As discussed above, any number of wavelength ranges may be used to generate the invisible light image 704b; in the example embodiment discussed below, the invisible light image 704b is imaged using NIR light.

In at least this example embodiment, the visible and invisible light images 704a,b are expressed as a number of channels 508a-d (FIG. 5). In at least some example embodiments, when the images 704a,b are spatially correlated with each other, the channels 508a-d representing the images 704a,b are also spatially correlated with each other. The visible light image 704a (identical in this example to FIG. 9A, which is discussed further below) is expressed as a 3-channel RGB image comprising a red channel 508a, a green channel 508b, and a blue channel 508c. The invisible light image 704b (identical in this example to FIG. 9B, as discussed further below), being NIR, is expressed as a single greyscale channel 508d. In at least some different example embodiments (not depicted), one or both of the images 704a,b may be expressed differently than as a 3-channel RGB image (for the visible light image 704a) and a greyscale image (for the invisible light image 704b). For example, one or both of the images 704a,b may comprise an RGB image; a YUV image; a greyscale image; a monochrome image; an RGB and depth (RGBD) image; and any suitable combination thereof.

In at least the depicted example embodiment, all of the channels 508a-d are concurrently present as input to be received by the CNN 500 prior to the CNN's 500 commencing image processing. For example, the channels 508a-d may be concurrently stored on the memory device 132 of the video capture device 108, and accordingly be ready for concurrent retrieval by the video analytics module 224. In at least the depicted example embodiment, from when the CNN 500 receives a first of the channels 508a-d of the images 704a,b until when the CNN 500 receives a last of the channels 508a-d, the CNN 500 receives channels from no other images. For example, the CNN 500 may concurrently receive all of the channels 508a-d as described above.

Additionally, in at least some different embodiments (not depicted), the channels 508a-d may be in an order other than the red, green, and blue channels 508a-c of the visible light image 704a followed by the greyscale channel 508d of the invisible light image 502b as depicted in FIG. 5.

Figure 6:
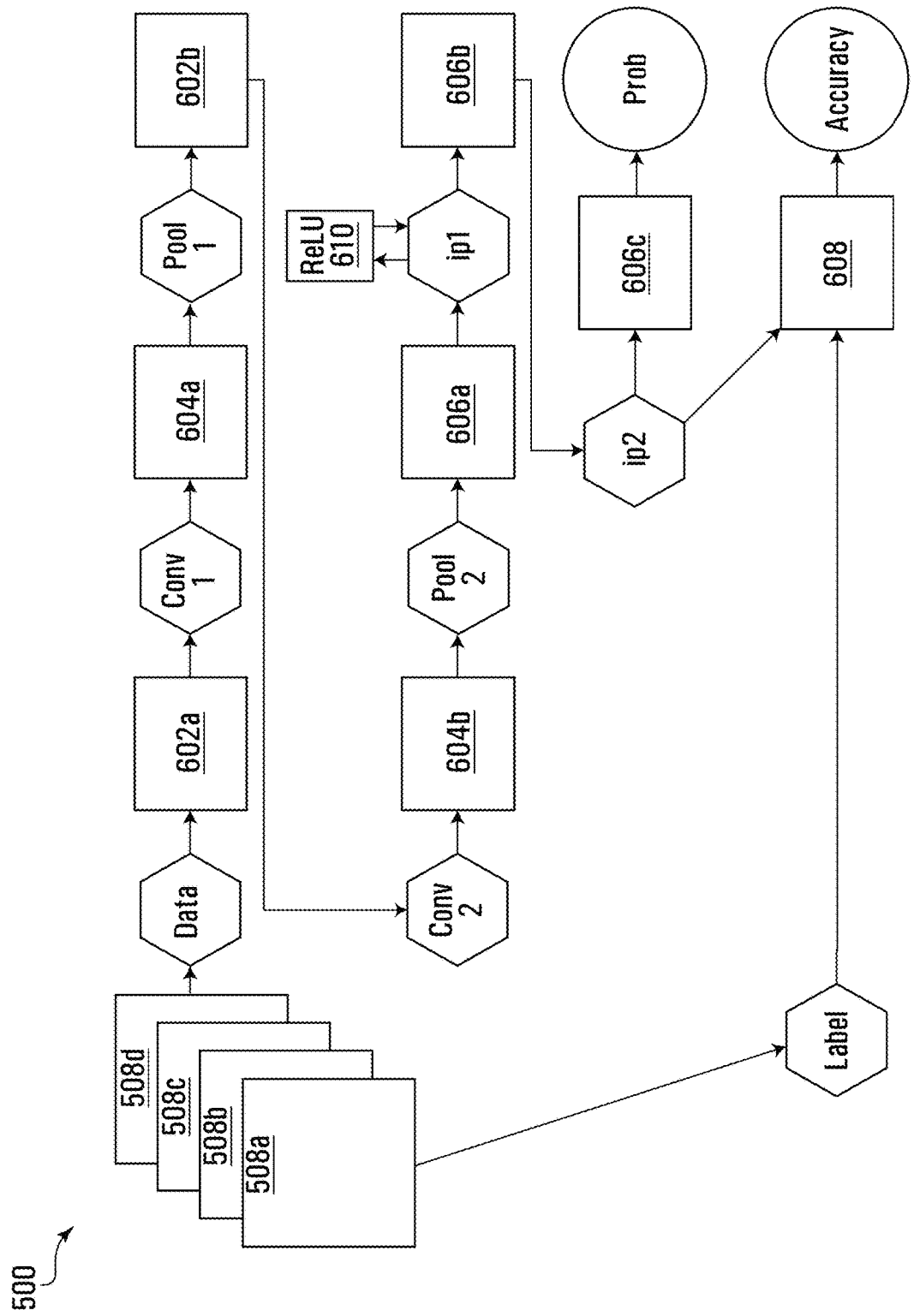
FIG. 6 depicts an example convolutional neural network used as the convolutional neural network of FIG. 5.

Once the CNN 500 has received the images 704a,b, the video analytics module 224 proceeds to block 406 and classifies the object-of-interest 702 using the CNN 500 and the visible and invisible light images 704a,b. FIG. 6 shows the CNN 500 used in at least one example of the depicted example embodiment. The CNN 500 comprises first and second convolutional layers 602a,b, with the first convolutional layer 602a receiving the visible and invisible light images 704a,b. The CNN 500 also comprises first and second pooling layers 604a,b, with the first pooling layer 604a receiving the output of the first convolutional layer 602a and providing the input of the second convolutional layer 602b, and the second pooling layer 604b receiving the output of the second convolutional layer 602b. The convolutional and pooling layers 602a,b and 604a,b collectively characterize the features of the visible and invisible light images 704a,b. The layers 602a,b,604a,b,606c are connected in series and sequentially process the channels 508a-d. However, in at least some different example embodiments (not depicted), the CNN 500 may comprise layers that are connected in parallel, or a suitable combination of series and parallel.

The CNN 500 further comprises a multilayer perceptron network comprising first and second fully connected layers 606a,b and an output layer 606c, with the input to the fully connected layers 606a,b comprising the output of the second pooling layer 604b. The input to the first fully connected layer 606a comprises the output of the second pooling layer 604b. A module 610 that applies the ReLU function is applied to the output data, labeled ip1, of the first connected layer 606a, thereby raising to zero any non-positive outputs of the first connected layer 606a. The output of the first connected layer 606a, after the ReLU function has been applied to it, is sent to the second connected layer 606b. The output of the second connected layer 606b, labeled ip2, is sent to the output layer 606c, which applies the Softmax function to output the probabilities that the object-of-interest 702 is any one of a number of objects, such as a human, a vehicle, an animal, etc.

During training of the CNN 500, in parallel with the processing done by the convolutional layers 602a,b, pooling layers 604a,b, and multilayer perceptron network, the training images are labeled and sent to a training module 608, which outputs a binary signal indicating whether the output of the second connected layer 606b (ip2) represents an accurate classification of the object-of-interest 702. The module 608 does this by determining whether argmax(ip2) is identical to a user entered classification ("Label", in FIG. 6) for the object-of-interest 702. If argmax(ip2) and the Label are identical, the CNN 500 properly classified the object-of-interest 702; if not, the CNN 500 misclassified the object-of-interest 702. During training, the training module 608 also determines the loss function, which is used for back propagation and updating the CNN's 500 parameters.

In at least the depicted example embodiment, the first convolutional layer 602a receives the channels 508a-d when they are input to the CNN 500 and processes them. After the first convolutional layer's 602a processing is complete, it sends its output to the first pooling layer 604a. The first pooling layer 604a then processes the output of the first convolutional layer 602a, and once the first pooling layer's 604a processing is complete, sends its output to the second convolutional layer 604b. The second convolutional layer 604b then processes the output of the first pooling layer 604a. This pattern continues until the channels 508a-d have been processed sequentially by each of the layers 602a,b, 604a,b,606a-c in the CNN 500. Accordingly, in at least the depicted example embodiment, the first pooling layer 604a does not process one of the channels 508a-d while the first convolutional layer 602a is processing another of the channels 508a-d. In at least some embodiments, this permits the CNN 500 to implicitly compare the visible and invisible light images 704a,b being processed. As used herein, a layer 602a,b,604a,b,606a-c is referred to as processing the channels 508a-d even if the input to that layer is not in the form of the six channels 508a-d input to the CNN 500. For example, in an example embodiment in which the second convolutional layer 602b has 32 kernels and accordingly outputs 32 channels to the second pooling layer 604b, when the second pooling layer 604b processes those 32 channels the second pooling layer 604b is said to be processing the channels 508a-d.

In at least some example embodiments, the region-of-interest may be the region within an image chip 904, as depicted in FIGS. 9A and 9B. FIGS. 9A and 9B correspond to FIGS. 8A and 8B, except that chips 904 are overlaid on FIGS. 9A and 9B, with each chip 904 being a region corresponding to portion of a frame of a captured video. Each of FIGS. 8A, 8B, 9A, and 9B depicts an example frame of captured video, with each of FIGS. 9A and 9B also depicting a bounding box 902 that delineates the chip 904. In at least some example embodiments, the chips 904 of the visible and invisible light images 704a,b are sent to the CNN 500 for classification of any objects-of-interest 702 therein, in accordance with the method 400 of FIG. 4.

During training, optimization methods (such as stochastic gradient descent), and numerical gradient computation methods (such as backpropagation) are used to find the set of parameters that minimize our objective function (also known as a loss function). A cross entropy function is used as the objective function in the depicted example embodiments. This function is defined such that it takes high values when it the current trained model is less accurate (i.e., incorrectly classifies objects-of-interest), and low values when the current trained model is more accurate (i.e., correctly classifies objects-of-interest). The training process is thus reduced to a minimization problem. The process of finding the most accurate model is the training process, the resulting model with the set of parameters is the trained model, and the set of parameters is not changed once it is deployed.

In at least some example embodiments, the CNN 500 is trained prior to deployment with pairs of training images, with a first training image of each pair comprising a training region-of-interest imaged using one of visible and invisible light, and a second training image comprising at least a portion of the training region-of-interest imaged using the other of visible and invisible light. In at least some example embodiments, the first and second training images are spatially correlated with each other and depict identical regions-of-interest. In at least some example embodiments, at least one of the first and second training images for some of the pairs of training images depicts a training object-of-interest, such as a person or a vehicle. Additionally or alternatively, in at least some example embodiments at least one of the first and second training images for some of the pairs of training images depict non-object features only, such as background scenery. In at least some of the foregoing example embodiments, for any given pair of training images, each of the training images may depict all or some of the same training object-of-interest; that object-of-interest may appear differently in the different training images because of the different wavelengths of light used to generate those images. Analogously, and more generally, in at least some of the foregoing example embodiments, for any given pair of training images, each of the training images may depict all or some of the same features; those features may appear differently in the different training images because of the different wavelengths of light used to generate those images.

The training images may be stored using any suitable storage device in any suitable format (e.g., in a database). As described above when the CNN 500 is deployed, during training the CNN 500 and more generally the artificial neural network may be trained using one or more visible light training images, one or more invisible light training images, or multiple visible light training images and invisible light training images. Also as described above when the CNN 500 is deployed, the training images that are concurrently input to the CNN 500 may be spatially correlated with each other and have substantially identical regions-of-interest in at least some example embodiments. In at least some alternative embodiments, the regions-of-interest between those training images may differ, the training images may not be spatially correlated, or both.

While the above description provides examples of the embodiments with human objects as the primary objects of interest, it will be appreciated that the underlying methodology of extracting chips from objects, computing a feature vector representation from them and furthermore, using this feature vector as a basis to compare against feature vectors from other objects, is agnostic of the class of the object under consideration. A specimen object could include a bag, a backpack or a suitcase. An object classification system to locates vehicles, animals, and inanimate objects may accordingly be implemented using the features and/or functions as described herein without departing from the spirit and principles of operation of the described embodiments.

Additionally, while the foregoing depicted embodiments are directed at an artificial neural network that comprises a convolutional neural network, in at least some different embodiments (not depicted), classification may be performed using one or more different types of artificial neural network. For example, the method 400 may be applied using any one or more of AlexNet, GoogleNet, and ResNet. The method 400 may additionally or alternatively be applied using a CNN detector that, in addition to object classification as described above, finds the location of the object-of-interest 702 in an image. Examples of CNN detectors include a "single-shot detector" and a "you only look once" detector, as described in Liu, Wei, Dragomir Anguelov, Dumitru Erhan, Christian Szegedy, Scott Reed, Cheng-Yang Fu, and Alexander C. Berg, "SSD: Single Shot MultiBox Detector" in European Conference on Computer Vision, pp. 21-37, and Springer, Cham, 2016 and Redmon, Joseph, Santosh Divvala, Ross Girshick, and Ali Farhadi, "You Only Look Once: Unified, Real-time Object Detection" in *Proceedings of the IEEE Conference on Computer Vision and Pattern Recognition*, pp. 779-788. 2016, respectively. As used herein, in at least some example embodiments performing object "detection" comprises performing object "classification"; in at least some different example embodiments, object "detection" may be done without performing object "classification".

Figure 13A:
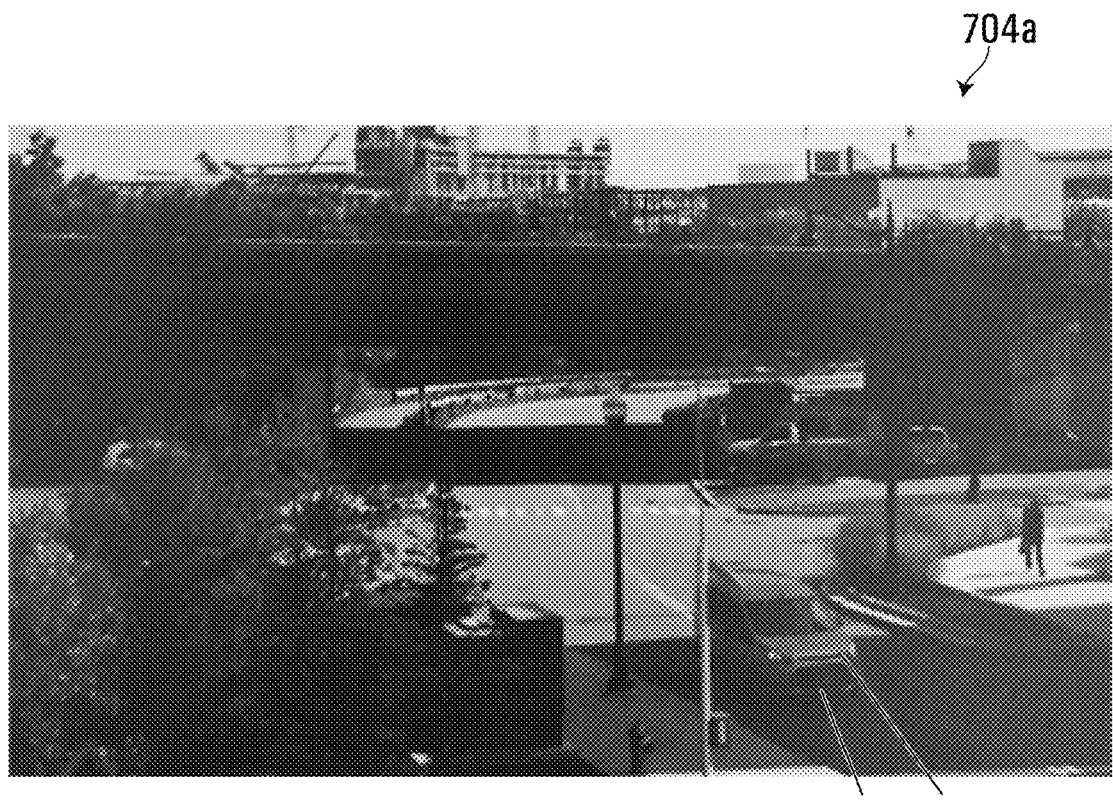
FIGS. 13A and 13B depict a visible light image (FIG. 13A) and an invisible light image (FIG. 13B) that is imaged using ultraviolet light, in which a vehicle is an object-of-interest depicted in both images.
Figure 13B:

Referring now to FIGS. 13A and 13B, there are depicted a visible light image 704*a* (FIG. 13A) and an invisible light image 704*b* (FIG. 13B), imaged using UV light, of a region-of-interest in which a vehicle is the object-of-interest 702. The video capture assembly 1000 may be used, for example, to generate the images 704*a,b* of FIGS. 13A and 13B. Different types of clothing and vehicle paint may look very similar when imaged using visible light, but have significantly different visual properties when imaged using invisible light such as UV light and IR light (whether SWIR light, LWIR light, or both). For example, vehicle paint applied to new vehicles by vehicle manufacturers may have very low UV light reflectivity, but after-market vehicle paint applied by body shops or consumers may have much higher UV light reflectivity. Consequently, vehicles that have been subject to after-market repairs may look different, when imaged using UV light as opposed to visible light, than the analogous vehicle that has not been similarly repaired. (For example, cars with after-market body work may have a distinguishably "patchy" appearance when their image is captured through a UV camera.) This may help to distinguish between two vehicles that, under visible light, have identical styling and color. Contrasting FIGS. 13A and 13B in particular, the object-of-interest 702 comprises a vehicle having a front bumper panel 1302 that has been repaired following a collision. The panel 1302 has been painted using a high-reflectivity UV paint that is different from the low-reflectivity UV paint used to paint the rest of the vehicle. The panel 1302 accordingly appears brighter in the invisible light image 704*b*, which is imaged using UV light, than the visible light image 704*a* of FIG. 13A.

Figure 14A:
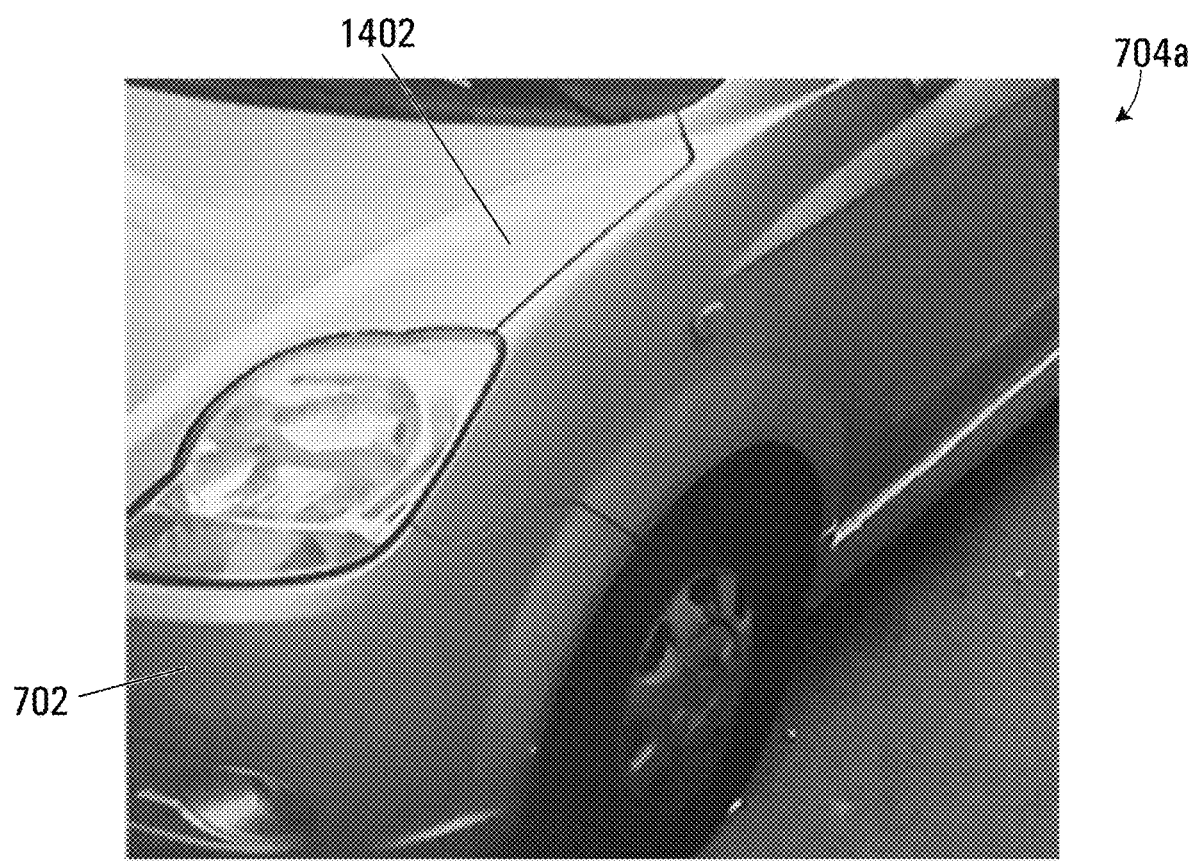
FIGS. 14A and 14B depict a vehicle in visible light (FIG. 14A) and invisible light in the form of ultraviolet light (FIG. 14B), in which repair work is highlighted in the invisible light image.
Figure 14B:
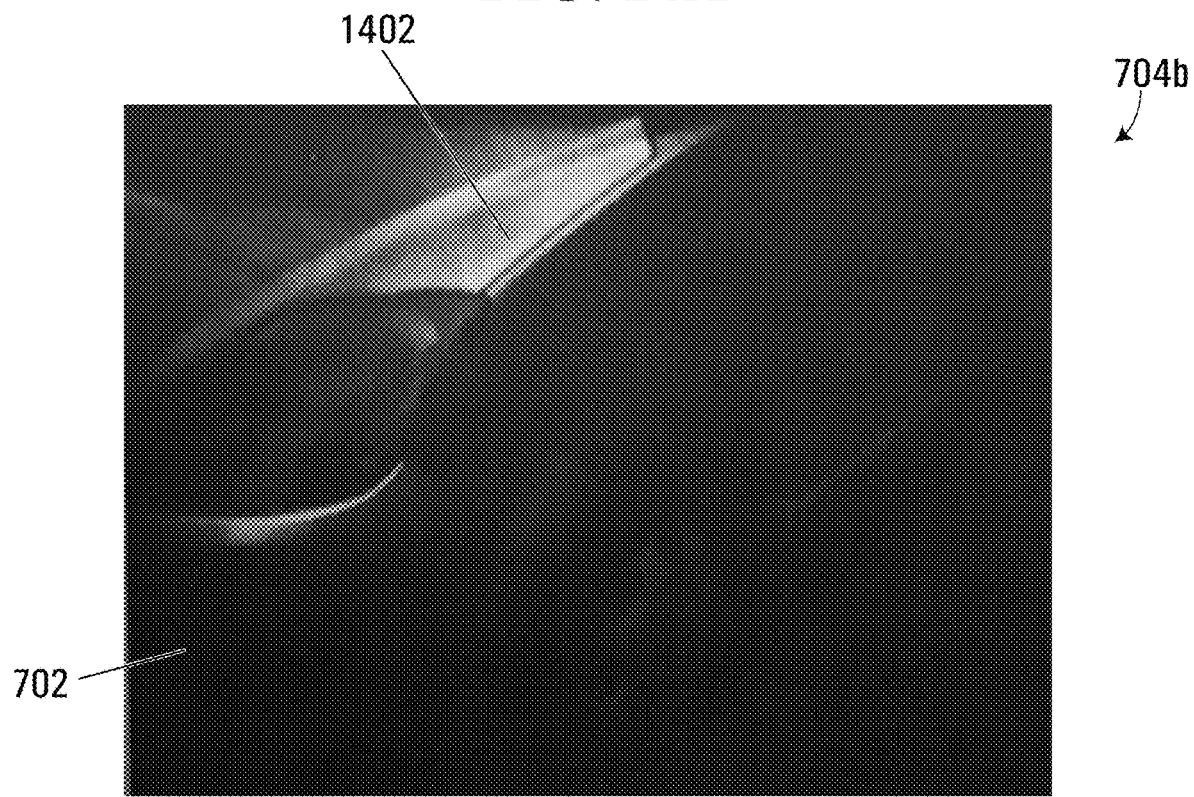

Referring now to FIGS. 14A and 14B, there is depicted an object-of-interest 702 in the form of a vehicle imaged using visible light (the visible light image 704*a* of FIG. 14A) and invisible light in the form of UV light (the invisible light image 704*b* of FIG. 14B). An edge of the vehicle's hood 1402 has been repaired and painted using high-reflectivity UV paint, as opposed to the low-reflectivity UV paint used by the manufacturer and that is on the remainder of the vehicle; this is evident by a portion of the hood 1402*b* in the invisible light image 704*b* of FIG. 14B being much lighter than the identical portion depicted in the visible light image 704*a* of FIG. 14A.

More generally, in at least some example embodiments, an object-of-interest 702 or other feature imaged by a video capture device 108 may comprise visual characteristics that are visible when imaged using invisible light, such as UV light, and not when imaged using visible light. These characteristics may be an unintentional byproduct of an action performed on an object-of-interest 702, such as a repair made to a vehicle as discussed above. Additionally or alternatively, these characteristics may be intentionally introduced to the object-of-interest 702; for example, a number may be painted on to an emergency vehicle using high UV-reflectivity paint in order to more easily identify that vehicle using video surveillance (especially in those instances where one particular vehicle needs to be distinguished, in a surveillance video search, from other vehicles that may be of the same color, model and/or design appearance). In another example in which the object-of-interest 702 is a person, that person may intentionally wear clothing of which at least portions have high UV reflectivity so as to be easily identifiable using visual surveillance.

Visual characteristics that are only visible when imaged using certain invisible light can also impact the finding of object matches using certain automated types of surveillance searching such as, for example, appearance searches as disclosed in U.S. Pat. Publ. No. 2018/0157939. In particular, these visual characteristics, which might otherwise not be picked up within a system that only processes visible light images, will be processed and reflected in the relevant signatures, which may in turn lower or raise similarity scores against certain other images with respect to which signatures may be compared.

Therefore, the above discussed embodiments are considered to be illustrative and not restrictive, and the invention should be construed as limited only by the appended claims.

The invention claimed is:

1. A method comprising:
receiving at a convolutional neural network:
a visible light image comprising a region-of-interest imaged using visible light; and
an invisible light image comprising at least a portion of the region-of-interest imaged using invisible light, wherein at least one of the visible and invisible light images depicts an object-of-interest within the portion of the region-of-interest shared between the visible and invisible light images; and
classifying and/or detecting the object-of-interest using the convolutional neural network, wherein the convolutional neural network classifies and/or detects the object-of-interest using the visible and invisible light images,
wherein the visible light image and the invisible light image are received at the convolutional neural network via an image sensor assembly comprising:
at least one image sensor; and
at least one filter that includes a visible light filter and an invisible light filter, the at least one filter positioned over the at least one image sensor to enable the at least one image sensor to image using the visible light and the invisible light.

2. The method of claim 1, wherein prior to receiving the visible and invisible light images the convolutional neural network has been trained to classify and/or detect the object-of-interest using training image pairs, each of at least some of the training image pairs comprising a first training image comprising a training region-of-interest imaged using visible light and a second training image comprising the region-of-interest imaged using invisible light, wherein at least one of the first and second training images depicts a training object-of-interest within the training region of interest.

3. The method of claim 1, wherein the visible light comprises wavelengths selected from a range of approximately 400 nm to approximately 700 nm.

4. The method of claim 1, wherein the invisible light comprises wavelengths selected from a range of approximately 10 nm to approximately 400 nm.

5. The method of claim 1, wherein the invisible light comprises wavelengths selected from a range of approximately 700 nm to approximately 1 mm.

6. The method of claim 1, wherein the invisible light comprises wavelengths selected from a range of approximately 0.1 cm to approximately 1 m or a range of approximately 2.7 mm to approximately 100 m.

7. The method of claim 1, wherein the visible and invisible light images collectively comprise a number of channels, and the convolutional neural network comprises at least some layers connected in series that sequentially process the channels.

8. The method of claim 1, wherein the convolutional neural network is implemented on a camera comprising part of a video surveillance system.

9. The method of claim 1, wherein the object-of-interest is depicted in only the invisible light image and not the visible light image.

10. The method of claim 1, wherein the object-of-interest is depicted in the visible and invisible light images.

11. The method of claim 1, wherein portions of the region-of-interest shared between the visible and invisible light images are substantially spatially correlated with each other.

12. The method of claim 1, wherein the portion of the region-of-interest shared between the visible and invisible light images is an entirety of each of the visible and invisible light images.

13. A video capture assembly comprising:
an image sensor assembly receptive to visible and invisible light, the image sensor assembly comprising:
at least one image sensor; and
at least one filter that includes a visible light filter and an invisible light filter, the at least one filter positioned over the at least one image sensor to enable the at least one image sensor to image using the visible light and the invisible light;
a processor communicatively coupled to the image sensor assembly; and
a memory device communicatively coupled to the processor, wherein the memory device has stored thereon computer program code that is executable by the processor and that, when executed by the processor, causes the processor to perform a method comprising:
receiving at a convolutional neural network:
a visible light image comprising a region-of-interest imaged using visible light; and
an invisible light image comprising at least a portion of the region-of-interest imaged using invisible light, wherein at least one of the visible and invisible light images depicts an object-of-interest within the portion of the region-of-interest shared between the visible and invisible light images; and
classifying and/or detecting the object-of-interest using the convolutional neural network, wherein the convolutional neural network classifies and/or detects the object-of-interest using the visible and invisible light images.

14. The assembly of claim 13, wherein the at least one image sensor comprises: a pair of image sensors positioned to have overlapping fields-of-view,
wherein the visible light filter is positioned over one of the pair of image sensors and the invisible light filter is positioned over the other of the pair of image sensors.

15. The assembly of claim 14, wherein the pair of image sensors are collocated within a housing.

16. A method comprising:
generating, using a video capture assembly that comprises part of a video surveillance system, a visible light image comprising a region-of-interest imaged using visible light and an invisible light image comprising at least a portion of the region-of-interest imaged using invisible light, wherein at least one of the visible and invisible light images depicts an object-of-interest within the portion of the region-of-interest shared between the visible and invisible light images, the video capture assembly comprising: at least one image sensor; and at least one filter that includes a visible light filter and an invisible light filter, the at least one filter positioned over the at least one image sensor to enable the at least one image sensor to image using the visible light and the invisible light;

sending the visible and invisible light images to an artificial neural network; and classifying and/or detecting the object-of-interest using the artificial neural network, wherein the artificial neural network classifies and/or detects the object-of-interest using the visible and invisible light images.

17. The method of claim 16, wherein prior to receiving the visible and invisible light images the artificial neural network has been trained to classify and/or detect the object-of-interest using training image pairs, each of at least some of the training image pairs comprising a first training image comprising a training region-of-interest imaged using visible light and a second training image comprising the region-of-interest imaged using invisible light, wherein at least one of the first and second training images depicts a training object-of-interest within the training region of interest.

18. A method comprising:

providing training image pairs to an artificial neural network, wherein at least some of each of the training image pairs comprise:

a first training image comprising a training region-of-interest imaged using visible light; and a second training image comprising a portion of the training region-of-interest imaged using invisible light, wherein at least one of the first and second training images depicts a training object-of-interest within the portion of the training region of interest shared between the visible and invisible light images; and training, by using the pairs of training images, the artificial neural network to classify and/or detect an object-of-interest that appears in at least one of the first and second training images, wherein the training object-of-interest is an identical type of object as the object-of-interest depicted in at least one of the visible and invisible light images.

19. The method of claim 18, wherein the first and second training images collectively comprise a number of channels, and the artificial neural network comprises a convolutional neural network that comprises multiple layers that are connected in series and sequentially process the channels.

20. The method of claim 18, wherein the portion of the training region-of-interest shared between the visible and invisible light images are substantially spatially correlated with each other.

21. The method of claim 18, wherein the portion of the training region-of-interest shared between the visible and invisible light images is an entirety of each of the visible and invisible light images.

* * * * *